No. 854,308. PATENTED MAY 21, 1907.
G. H. PETRI.
FORMING MACHINE.
APPLICATION FILED FEB. 23, 1906.

3 SHEETS—SHEET 1.

WITNESSES
A. T. Palmer
Olivier P. Schwammer

INVENTOR
GUNTHER H. PETRI
BY HIS ATTORNEY
Everett E. Kent

No. 854,308. PATENTED MAY 21, 1907.
G. H. PETRI.
FORMING MACHINE.
APPLICATION FILED FEB. 23, 1906.

3 SHEETS—SHEET 2.

WITNESSES

INVENTOR
GUNTHER H. PETRI
BY HIS ATTORNEY

No. 854,308. PATENTED MAY 21, 1907.
G. H. PETRI.
FORMING MACHINE.
APPLICATION FILED FEB. 23, 1906.

3 SHEETS—SHEET 3.

CONE ROTATES

LUMP GOES UP 20
KNEADING STARTS AT
5" DISCHARGED
AT 6" ONTO
21

WITNESSES
A. T. Palmer
Oliver P. Schoonmaker

INVENTOR
GUNTHER H. PETRI
BY HIS ATTORNEY
Everett E. Kent

UNITED STATES PATENT OFFICE.

GUNTHER H. PETRI, OF BOSTON, MASSACHUSETTS.

FORMING-MACHINE.

No. 854,308.   Specification of Letters Patent.   Patented May 21, 1907.

Application filed February 23, 1906. Serial No. 302,376.

*To all whom it may concern:*

Be it known that I, GUNTHER H. PETRI, a citizen of the United States, residing at Boston, in the county of Suffolk and State of Massachusetts, have invented new and useful Improvements in Forming-Machines, of which the following is a specification.

This invention relates to machines for forming dough or other plastic material into balls.

The object of the invention is to improve the construction, reduce the expense of manufacture and reduce the labor or attendants required in operating machines for this purpose; also to provide a machine which is adjustable for making different sizes of balls, which is automatic in operation, and has the other improvements and advantages of the invention hereinafter described.

The objects are accomplished by providing a rotating conical surface, upon which a suitable mass of dough rests, and in connection therewith a stationary trough concave toward the conical surface and provided with a rib projecting from the concave part of the trough toward said conical surface, said rib being adjustable with respect to the surface and also with respect to the lower edge of the trough. Automatic means is also provided for conveying masses of dough to said trough and conical surface, and for removing completed balls of dough from the discharge end of the trough without the care of an attendant. A rim is also provided surrounding the lower edge of the conical surface. This rim may be stationary and may operate in conjunction with the rotating table and in conjunction with the admission end of the ribbed trough, to assist in the rolling operation and to feed balls of dough into said ribbed trough automatically. The rim also protects attendants from contact with the table and protects the contents of the table.

Figure 1:
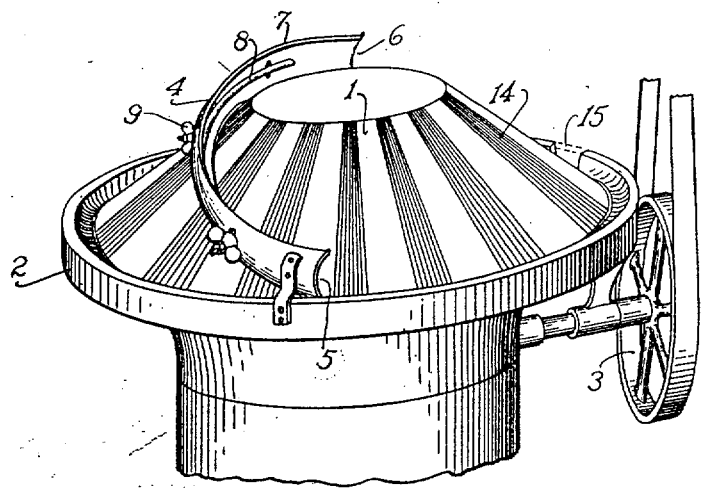
Figure 2:
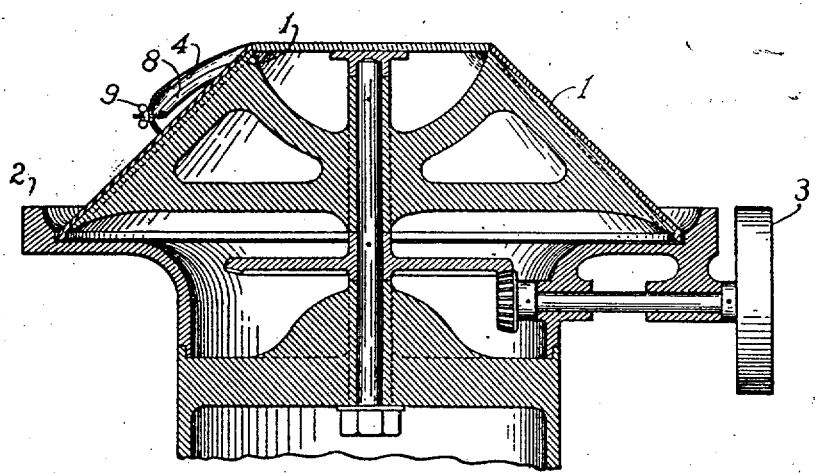
Figure 3:
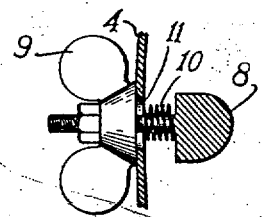
Figure 4:
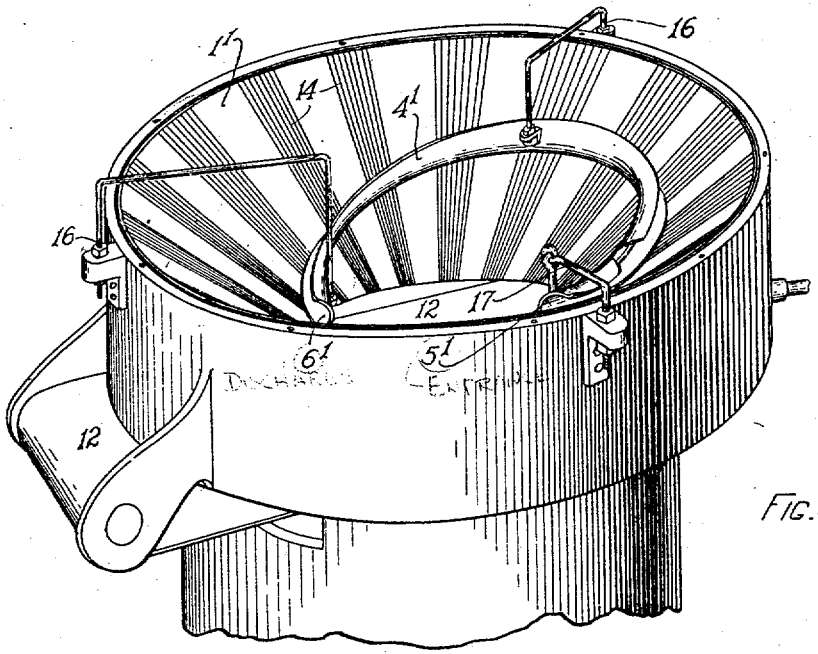
Figure 5:
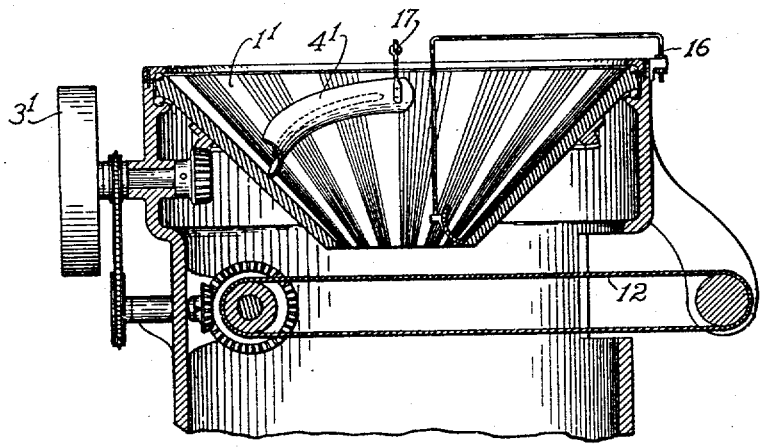
Figure 6:
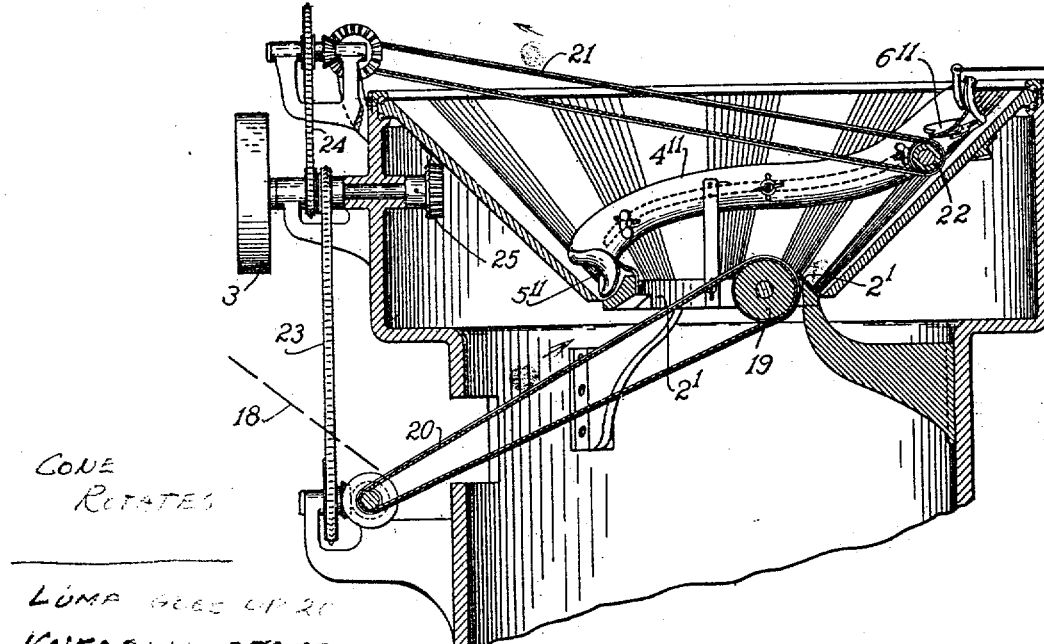
Figure 7:
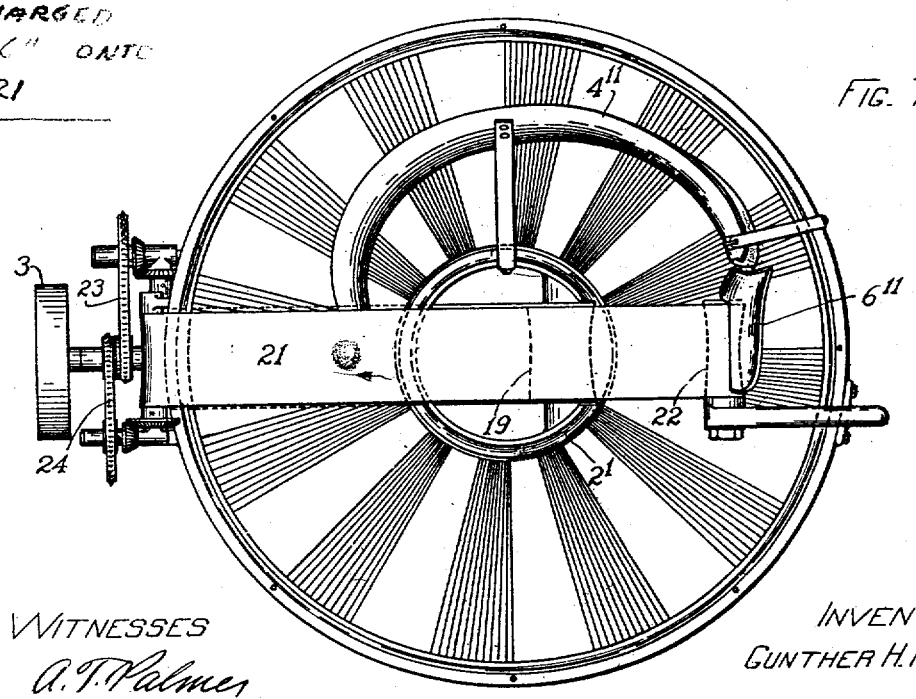

In the accompanying drawings Figure 1 shows one form of the invention in perspective. Fig. 2 is a sectional elevation of the same. Fig. 3 is a sectional elevation of a detail of Figs. 1 and 2. Fig. 4 is a perspective view of another form of the invention. Fig. 5 is a sectional elevation of the same viewed in the opposite direction from Fig. 4. Fig. 6 is a sectional elevation of another form. Fig. 7 is a plan of the form shown in Fig. 6.

Referring to the drawings, and particularly to Figs. 1, 2 and 3:

1 is a table, having a conical surface, mounted rotatably upon a vertical axis and arranged to be driven by a driving wheel 3. The table may have striations 14, corrugations or be otherwise roughened a little if desired. Its lower edge is surrounded by a stationary inclined rim 2, inclined or curved toward the table and arranged to cast back upon the lower part of the conical surface any dough which slides down the conical surface thereto. In conjunction with the lower part of the table this constitutes a trough, one part of which trough is stationary and the other part moving parallel thereto.

Another trough 4, which herein will be called the forming trough, is supported stationarily over the surface of the rotating table. The support may conveniently consist of a strap bolted to the fixed rim 2, as shown in Fig. 1. The forming trough is concave toward the table and has an entrance arch 5, both edges of which are closely adjacent to the table, and a delivery end 6 at which the upper edge 7 of the trough is more remote from the table, as clearly shown in Fig. 1, the recession of this upper edge occurring gradually from beginning to end. A rib 8 is fixed longitudinally within the forming trough, in a position between the arch thereof and the table. This rib preferably extends only in the middle portion of the length of the trough. It also projects to a greater distance from the arch in the middle than near the ends, its degree of projection being arranged to increase gradually from its point of beginning to the center and then to decrease gradually till it ceases.

The dough entering the forming trough at 5 is carried along by the table and is made to roll by friction against the trough and rib as it progresses in the trough. By arranging the trough with its upper edge gradually more remote from the table (shown exaggerated in the drawing), the rib, which at first bears upon the top of the mass of dough, gradually comes to bear upon the side thereof as the dough is formed into a ball and rolls onward, thus giving a more accurately spherical shape. The completed ball of dough rolls out at the discharge end 6, and in Fig. 1 it is planned that it will be removed by an attendant. If, however, the attendant fails to catch the ball, or if it is desired to manipulate the dough further, it will roll down the incline of the table. If a succession of balls should come out without being received by the attendant they would pile up, fill the rim and roll upon the floor, except for the feature of the invention by which each ball when it strikes the rim is thrown back into contact with the rotating table and is rolled along thereby so that it is out of the way when the next ball strikes. When carried far enough it encounters the opening 5 of the forming trough and goes through the process over again and is thus saved loss by falling upon the floor. Where extra manipulation is required this enables dough to pass through the process repeatedly until it has attained the desired shape and consistency, when it may be removed. By this repeating feature a small and relatively inexpensive machine may do work for which a larger machine would ordinarily be required. If desired, a section of the rim may be removed forming a gap 15 in the rim where the balls would strike the rim on falling from the discharge of the trough, and a basket, chute or mechanical conveyer 12' may be arranged to receive them. In this event the balls which do not strike the rim are not subject to the repeated manipulation above described. By arranging the opening only in the direct path of descent of a perfect ball from the discharge of the trough, the selection will be made automatically between balls that are perfectly formed and those that are not and hence require further forming; for only the former will reach the opening, and the latter, being delayed by their imperfect form in rolling down the table, will not reach the rim until the rotation of the table has carried them past the opening. These, therefore, will be thrown back upon the table and carried through the forming trough again.

To form balls of different sizes it has heretofore been thought necessary to provide troughs of different sizes, a separate one for each size ball desired. These are manufactured only at considerable cost, being difficult castings to form; and to equip a machine completely with a set of them has been both expensive and cumbersome. One feature of the invention overcomes both difficulties by making the forming rib adjustable in position. For this purpose the rib is mounted adjustably within the trough and is composed of slightly flexible material. The general arrangement of the mounting is shown clearly in Fig. 2, and in larger detail is shown in Fig. 3.

The rib 8 carries a stud projecting through the trough, having a screw thread and a thumb nut 9 on the outside, which when tightened draws the rib away from the table and toward the trough; but the rib is normally held at a short distance from the trough by a spiral spring 10 strung upon the stud. The stud is adjustable with respect to the lower edge of the trough and may be fastened in any different position in the slot 11 by means of the thumb nut 9. A lock nut may conveniently be provided outside the thumb nut on the same stud, as shown, to hold it in place when screwed to the proper tension, the degree of tension depending upon the degree which it is desired to draw the rib 8 toward the trough 4. This adjustment moves the rib away from the table toward the trough, and thereby compresses the springs 10. When the thumb nut is released a little the spring pushes the rib out a corresponding amount toward the surface of the table. Slight flexibility of the rib aids in making the precise degree of adjustment desired at each point of support. When a mass of dough enters the forming trough it at first rolls between the trough and the table in contact with each, but when it encounters the rib it rolls and is formed between the rib and table, and hence the size of the ball is determined by the distance of the rib; while the fact that the rib is not a complete inclosing surface like the trough gives greater freedom in forming the ball and enables it to bulge a little on the sides of the rib if the size of the mass of dough so requires.

Another form of the invention is shown in Figs. 4 and 5, in which the forming trough is marked 4' and is set adjacent to a conical table, 1', having the peculiarity that it is the interior surface of an inverted cone. A trough 4' is set stationarily above the moving surface, as in the previously described form. Dough enters at the entrance 5' of the trough and is carried by the rotation of the cone and slope of the conical trough and by force of gravity, the weight of the dough assisting in the operation, down the trough, and is discharged at 6' where it falls upon a moving belt 12, which carries each ball out from under the table. By operating upon the concave surface of the cone the dough is gripped more securely by the table.

The form of adjustment shown in Fig. 4 consists in adjusting the position of the entire forming trough upon a hinge about the entrance end 5'. That end remains stationary and the delivery end 6' is raised vertically a suitable distance by adjustment of the screws 16, the trough turning upward as upon a hinge, about its stationary support at 17. By thus raising the forming trough all parts of it are caused to recede from the conical surface, in a direction substantially parallel to the axis of the cone, the extent of recession varying from its maximum at the end 6' to zero at the entrance end 5'. This causes the rib to recede with the trough, and the space existing between the rib and the surface, in which a mass of dough can roll, is thus increased; while at the entrance end, in which the dough may be assumed to be in a more plastic state, and less cohesive, the confining effect of the trough is not lost because it remains almost as it was before adjustment. This method does away with the necessity for providing a set of substitute ribbed troughs for different sizes of balls.

An adjustment which has greater operative limits, and which at the same time can be adjusted to a finer degree, may be attained by making the rib adjustable with respect to the trough, as previously described, in addition to making the trough adjustable. By raising the entire trough, including the hinge, capacity to handle larger masses of dough is attained.

Figs. 6 and 7 show another form, in which an internal conical surface is employed, in which the entrance of the trough is at its lower end and the dough is carried upward. This figure also shows a rib adjustable within the trough and an adjustable trough, as heretofore described. A fixed rim 2' is provided at the bottom of the incline of the table, similar in function to the fixed rim 2 of Fig. 1, and there is a conveyer belt 20 arranged to receive masses of dough and by passing over roller 19 located in the bottom opening of the cone to deposit them upon the rim 2', whence they fall against the rotating surface 1' of the table. By conjunction of this fixed and this rotating surface they are carried and incidentally somewhat rolled along until they encounter the entrance 5'' of the trough. Having entered, each mass is rolled upward on the incline against the rib and formed into a ball and delivered upon an auxiliary delivery plate 6'', whence it rolls on a removing belt 21 and is carried away to any desired place. By this mechanism the masses of dough may come directly from an adjacent machine (not shown in the drawings) for cutting masses of proper size, as, for instance, by falling down a chute indicated at 18, and will then be caught by the belt 20, put through the machine, and come out as balls upon the belt 21, which belt being nearly level and having, if desired, a roughened surface, will carry them to a point whence they can roll down a chute into another room or any other desired position for the next operation, thus making the entire operation of this machine automatic. By making the rollers 22, over which the belt 21 passes, slightly concave a trough-like shape is given to that belt, which prevents any ball from rolling off of the side of the belt. The belts 20 and 21 may conveniently be driven by sprocket chains 23 and 24 respectively, which mesh with sprocket wheels on the main driving shaft of the machine, the rotating table itself being driven by a gear 25 upon the same shaft.

I claim:

1. A forming machine for plastic material, comprising a carrier having a concave surface, a trough concave toward said surface, the radii of curvature of the said two concave surfaces being diverse; and means to produce relative motion between them in a direction crossing the trough.

2. A forming machine for plastic material, comprising a table having a concave conical surface; a trough adjacent thereto, concave toward said surface; and means to produce relative motion between the two in a direction crossing the trough.

3. A forming machine for plastic material, comprising a table; a trough concave toward the table; means for producing relative motion between them; and a rib adjustable with relation to the surface of the table, set longitudinally in the concave portion of the trough.

4. A forming machine for plastic material, comprising a table; a trough, concave toward the table; means for producing relative motion between them; and a rib set longitudinally in the trough, projecting toward the table and adjustable in position with respect to the trough.

5. A forming machine for plastic material, comprising a table; a trough, concave toward the table; means for producing relative motion between them; and a flexible rib set longitudinally in the trough, projecting toward the table and adjustable in position with respect to the trough.

6. A forming machine for plastic material, comprising a conical table; a trough, concave toward the table; means for producing relative motion between them; said trough being supported at one end by a hinge set perpendicular to the axis of the table and having supports elsewhere adjustable in position parallel to the axis and hinged parallel thereto, whereby its angle, with relation to the axis of the table, may be adjusted.

7. A forming machine for plastic material, comprising a conical table; a trough, concave toward the table; means for producing relative motion between them; and means to withdraw the trough from the table in the direction of the axis of the table to a position parallel with its first position, comprising supports mounted on screws having axes parallel to the axis of the table.

8. A forming machine for plastic material, comprising a rotatable conical table; a rim at the lower edge thereof; and a forming trough, concave toward the table, the entrance of the trough being adjacent to the rim.

9. A forming machine for plastic material, comprising a rotatable conical table; a stationary rim at the lower edge of the table, inclined toward the table; and a forming trough, concave toward the table.

10. A forming machine for plastic material, comprising a rotatable conical table; a stationary rim at the lower edge of the table, inclined toward the table; and a forming trough, concave toward the table; there being a gap in the rim for passage of formed masses delivered by gravity from the trough.

11. A forming machine for plastic material, comprising a rotatable conical table; a stationary rim at the lower edge of the table, inclined toward the table; and a forming trough, concave toward the table; there being a gap in the rim for passage of balls delivered from the trough, said gap being located only in the path of perfectly formed balls, whereby the rim will intercept imperfectly formed balls.

12. A forming machine for plastic material, comprising a rotatable conical table, having its concave surface upward and apex removed; a forming trough, concave toward the surface, running spirally between the apex and base portions of the table; and a conveyer connecting the apex portion with the exterior of the machine.

13. A forming machine for plastic material, comprising a rotating conical table having its concave surface upward and apex removed; a belt conveyer, conveying material to the apex portion of the table; a rim adjacent thereto; a forming trough, starting near the rim and leading spirally upward on the conical surface; and a mechanical conveyer arranged to receive the delivery from the trough and convey the same to the exterior of the machine.

14. A forming machine for plastic material, comprising a rotating conical table; a trough concave toward the surface thereof, having an entrance end near the apex and a discharge end near the periphery of the table; means to produce relative motion between the trough and table; the whole being formed and arranged for passage of the material in a centrifugal direction.

In testimony whereof I affix my signature, in presence of two subscribing witnesses.

GUNTHER H. PETRI.

Witnesses:
ELLIOTT B. CHURCH,
EVERETT E. KENT.